United States Patent [19]
Evans

[11] 3,713,669
[45] Jan. 30, 1973

[54] MUD FLAPS

[76] Inventor: James P. Evans, 3233 S.W. 23rd St., Oklahoma City, Okla. 73109

[22] Filed: May 13, 1971

[21] Appl. No.: 143,069

Related U.S. Application Data

[63] Continuation-in-part of Ser. No. 133,832, April 14, 1971.

[52] U.S. Cl. .......................................... 280/154.5 R
[51] Int. Cl. .............................................. B62d 25/16
[58] Field of Search ....... 280/154.5 R, 152; 298/15 G

[56] References Cited

UNITED STATES PATENTS

| | | | |
|---|---|---|---|
| 3,632,137 | 1/1972 | Jossy | 280/154.5 R |
| 3,129,956 | 4/1964 | Eaves | 280/154.5 R |
| 3,580,604 | 5/1971 | Overend | 280/154.5 R |
| 3,027,178 | 3/1962 | Eaves | 280/154.5 R |
| 2,619,363 | 11/1952 | Wenham | 280/154.5 R |

*Primary Examiner*—Leo Friaglia
*Assistant Examiner*—Robert R. Song
*Attorney*—Dunlap, Laney, Hessin & Dougherty

[57] ABSTRACT

Mud flap devices which are particularly adapted for use with truck trailers that are adjusted in what is known as the west coast setting of the rear or tandem wheels, that case where the wheels are set to the extreme rear of the trailer, such mud flap devices being characterized by a forward protruding transverse configuration which in the mounted position will be disposed adjacent the rear edge of the trailer wheel and which will suspend a lower flap portion downward at a position several inches rearward of the vertical plane in which the forward protruding configuration lies. The mud flap devices will then be secured ahead of the T-bar or bumper of the trailer and will include characteristic reenforcement devices to insure the proper transverse protruding portion and rearward-disposed suspended portions.

7 Claims, 7 Drawing Figures

PATENTED JAN 30 1973 3,713,669
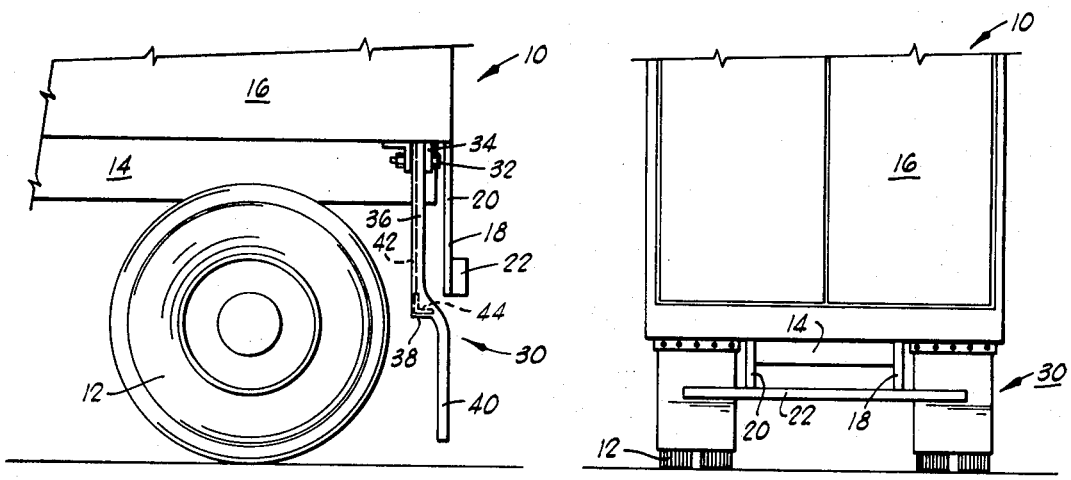
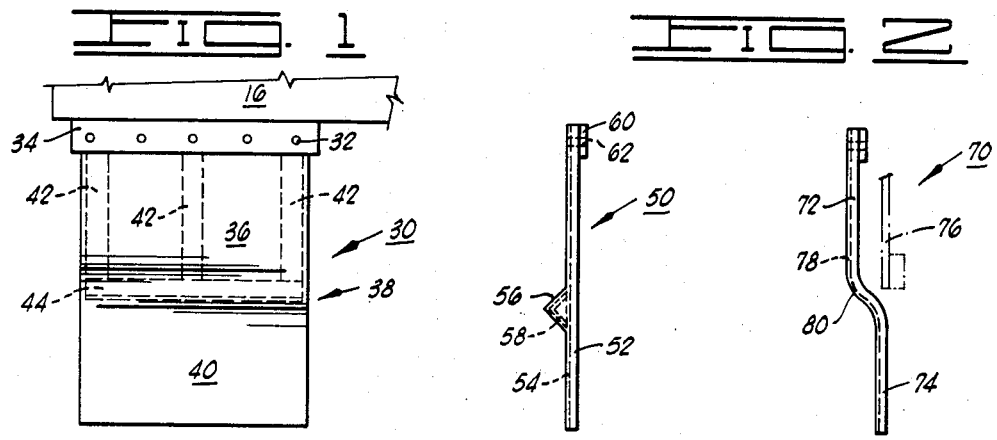
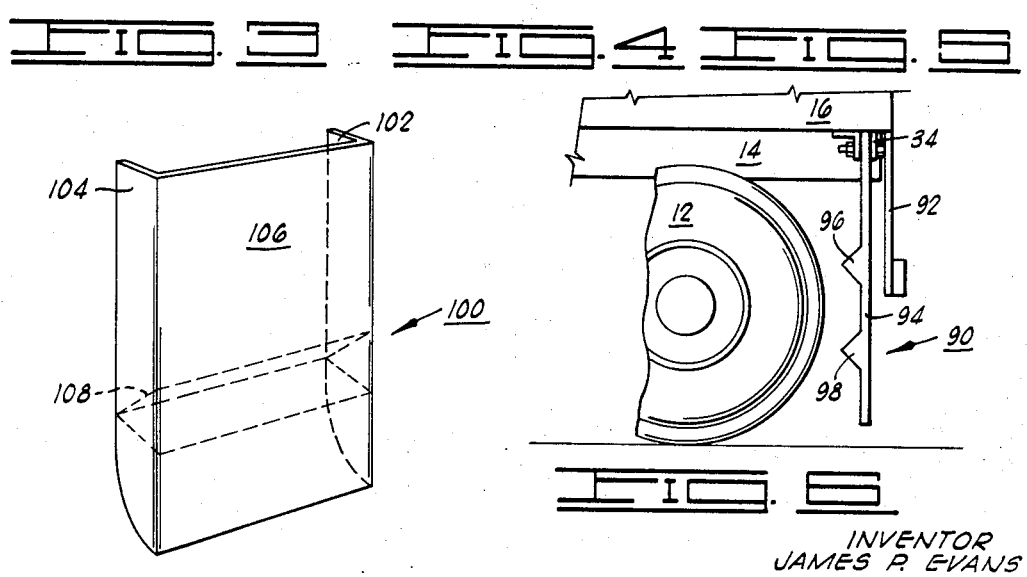
INVENTOR
JAMES P. EVANS
BY
Dunlap, Laney, Hessin & Dougherty
ATTORNEYS

MUD FLAPS

CROSS-REFERENCE TO RELATED APPLICATION

The present invention constitutes a continuation-in-part of the subject matter disclosed and claimed in the patent application titled "Improvements in Mud Flaps" filed in the name of James P. Evans on April 14, 1971 under application Ser. No. 133,832.

BACKGROUND OF THE INVENTION

1. Field of the Invention

The invention relates generally to mud flap accessories and, particularly, but not by way of limitation, it relates to improvements in suspended mud guard members as employed on trucks and semi-trailers, and particularly those trailers aligned in accordance with the west coast rear wheel setting.

2. Description of the Prior Art

The prior art includes various types of mud guard devices and these may embody all manner of features ranging from air directing flow vanes to mechanically movable parts or components which are intended to operate in a manner which improves the overall function of the device. It is well-known to reenforce mud guard devices by whatever means in order to bring about an anti-sail capability, and this can be very important to roadway performance as some states have legislative regulation relative to the types and requirements of truck trailer mud guards. While, as stated, there are diverse types of guard available, there is yet to be proposed a type of guard which offers any longevity of usage as applied on general hauling vehicles, the replacement rate of mud guards in this instance being extremely high. Such replacement necessity is further accentuated relative to truck trailers having west coast wheel setting since the wheels and mud guard assembly must be positioned at the extreme rear and close to the various loading docks and other accessory devices located in and around dock yards.

SUMMARY OF THE INVENTION

The present invention contemplates a mud guard device which may be secured to a truck trailer having west coast wheel setting or the like, and to extend down behind the vehicle wheel in such a manner that it is effective to block flying stones, spray and mud, as well as to avoid tearing of the mud guard by the vehicle wheel itself. In a more limited aspect, the invention consists of a mud guard member which is relatively flexible but reinforced, and which includes a forwardly protruding portion generally aligned with the vertical center of the vehicle wheel, such forward protrusion serving to maintain the lower and more rearwardly disposed portion of the mud guard at greater than a minimum distance behind the vehicle tire to avoid interference with dock blocks, curbs and the like. The flaps are particularly adapted for use with trailers having the T-bar or other type of bumper since the advantageous functions of the forward protruding portion and the rearwardly disposed suspended portion may still be utilized in conjunction therewith.

Therefore, it is an object of the present invention to provide an improved mud guard having a longer life expectancy when applied in truck and semi-trailer applications, and particularly those semi-trailer configurations having what is known as the west coast rear wheel setting.

It is also an object of the present invention to provide an apparatus which performs the mud guard function while fulfilling all of the known state regulation requirements as to height and effectiveness without any danger of interfering with truck wheels when approaching dock blocks, curbs, etc.

It is still further an object of the present invention to provide an anti-sail mud guard device as used in combination with a T-bar or rear bumper, but which is capable of long term usage without the usual disadvantages of tearing, bending or being generally reduced to an ineffective status.

Finally, it is an object of the present invention to provide truck trailer mud flaps offering much increased economy through extension of endurance and reliability at the comparable original cost.

Other objects and advantages of the invention will be evident in the following detailed description when read in conjunction with the accompanying drawings which illustrate the invention.

BRIEF DESCRIPTION OF THE DRAWING

FIG. 1 is a side elevation of a mud flap device and truck trailer wheels as placed in the west coast or rearmost wheel-setting;

FIG. 2 is a rear elevation of mud flaps constructed in accordance with the present invention and installed ahead of a trailer bumper device as shown generally in FIG. 1;

FIG. 3 is a rear elevation of the mud flap of FIGS. 1 and 2 with internal components shown in dashed-lines;

FIG. 4 is a side view of an alternative form of mud flap constructed in accordance with the present invention;

FIG. 5 is a side view of still another alternative form of mud flap;

FIG. 6 is a side view of yet another form of the invention; and

FIG. 7 is a perspective rear view of a mud guard device embodying the principles of the invention and including side-guard portions formed integrally therewith.

DETAILED DESCRIPTION OF THE PREFERRED EMBODIMENT

Referring to FIG. 1, a truck trailer 10 is depicted as having what is known as west coast rear wheel setting, i.e. the rear wheel 12 is positioned at the rearmost position of the trailer frame 14 and trailer body 16. The positioning of rear wheels 12 is generally an adjustable feature as effected by those skilled in the art. The trailer 10 also includes a T-bar type of rear bumper assembly 18 which consists of vertical supports 20 as suitably secured to the rearmost portions of frame 14 to suspend a crossbar 22 parallel to the ground and generally adjacent to the rearmost or vertical central portion of the rear wheels 12.

A mud flap device 30 is suitably secured as by threaded fasteners 32 to a bracket assembly 34 which is suitably secured as by welding or the like beneath the rear edge of the truck body 16. Bracket assembly 34 is mounted just forward of the bumper vertical supports 20 so that a mud flap upper portion 36 extends vertically immediately ahead of the bumper 18 to maintain a transverse protruding portion 38 adjacent the rear edge or the vertical center of the rear wheel 12 so that a lower portion 40 of mud flap 30 is suspended more rearwardly therefrom.

The framing and structure of mud flap 30 may be carried out in any of various ways, some alternatives of which will be set forth hereinafter the primary requirements of the configuration being provision of a middle portion which can be affixed in forwardly protruding relationship relative to the lower suspended portion to be maintained several inches rearward thereof. Proper adjustment as to mud flap height relative to the ground will then allow non-interfering contact and coaction with dock blocks, curbs and the like without danger of binding between the dock block and rear wheels 12 such that mud flap 30 will be torn loose from bracket assembly 34.

As shown in FIGS. 1 and 3, the mud flap 30 includes reenforcing elements such as vertical plates or strips 42 of relatively thin gauge steel or the like. The vertical strips 42 are each suitably secured to a transverse support member 44 which serves to provide skeletal support for formation of the forward protruding portion 38. Thus, transverse support member 44 may be such as an angle-shaped metal element which can be suitably affixed as by welding to vertical strips 42 to extend an angle portion rearward. Thus, rubber or plastic composition molded over the skeletal framework will be suitably shaped in cross-sectional configuration and adequately reenforced such that lower flap portion 40 can be suspended in an offset vertical plane further to define the forward protrusion 38.

In operation, the mud flap 30 is installed as shown in FIG. 1 with the bottom edge of the lower portion 40 relatively close to the ground to prevent excessive splash and spray when the truck is in motion through inclement weather conditions. When the trailer 10 is backed toward a loading dock, and as is the case with most loading dock areas, the wheels 12 must move over dock blocks as the truck backs up. When the lower flap portion 40 contacts a dock block, as the truck moves rearwardly, lower flap portion 40 is urged in a forward direction but, prior to the time when it could be contacted and caught between the dock block and rear tire 12, the forward protruding portion 38 will have contacted rear wheel 12 such that lower flap portion 40 will be effectively pulled upward and out of interfering contact as between the dock block and rear wheel 12. Standardized selection of mud flaps will dictate the distance in inches, between the vertical plane of upper flap portion 36 and the vertical plane of lower flap portion 40, which is sufficient to maintain non-interfering dock block contact for all cases.

Referring now to FIG. 4, an alternative form of mud flap 50 consists of simply a planar flap 52 as reenforced by one or more vertical reenforcing strips 54 and having mounted on the forward side thereof a protruding portion 56. The forward protruding portion 56 may be formed by fastening an angle-shaped element 58 transversely across the vertical securing strips 54, this structure providing a skeletal framework for receiving and holding suitable molded substance which is selected to form the body of the mud flap 50. The mud flap 50 then includes a reenforcing strip 60 and a plurality of securing holes 62 of standard dimension and spacing for the purpose of being secured in the bracket assembly of the truck trailer.

FIG. 5 illustrates still another form of mud flap 70 which is formed merely as a shaped planar form having an upper portion 72 and a lower portion 74, and which is shaped for coaction with a truck bumper assembly 76, as shown in dashed-lines. The mud flap 70 may be reenforced with a selected configuration of framing strips or structure 78 which are uniform along the vertical length of the mud flap 70, but which may be formed to take a permanent transverse shape such as to define forward protruding portion 80.

Thus, here again mud flap 70 is formed as an upper portion 72 in a first forward vertical plane, which terminates in a lower portion 74 in a second vertical plane disposed several inches rearward of the first vertical plane; and forward protruding portion 80 at the bend of the mud flap 70 is suitably disposed for coaction with the truck bumper 76. The coacting feature relative to bumper 76 is important in the cases of west coast wheel setting since the rear edge of trailer wheels 12 will come very nearly to the rearmost part of truck trailer 10, and in order for the selected mud flap to include a forward protruding portion and a lower flap portion, it must generally be suspended around and beneath the bumper 76.

The depiction of FIG. 6 illustrates still another form of mud flap 90 suspended in coaction with a rear bumper 92. The mud flap 90 is formed as a planar portion 94, as suitably reenforced by any of the above framing methods, and including a pair of forwardly oriented and spaced transverse portions 96 and 98 arranged for suspension equi-distant from the vertical center of trailer wheel 12. The mud flap 90 may be formed utilizing any of various structural methods as previously discussed, the important feature being the provision of spaced transverse forward protrusions 96 and 98.

FIG. 7 illustrates a mud flap 100 which is essentially the same as the mud flap 50 of FIG. 4 with the exception that it includes side portions 102 and 104 formed integrally therewith. Thus, mud flap 100 is formed with a planar portion 106 and a forward protruding portion 108, as suitably formed, e.g. in the manner discussed above, in transverse relationship across the forward side thereof. The side portions 102 and 104 are then formed integrally with the planar portion 106 by suitable and well-known reenforcing and molding methods. The mud flap 100 is intended to provide still greater spray deflection by curtailing the mist and outward spray which is often missed by a single plane rearward-disposed mud flap. Thus, mud flap 100 includes features directed to both greater spray protection and avoidance of dock block tearing and bending; also, the side portions 102 and 104 tend to lend an anti-sail quality.

The foregoing illustrates and describes novel teachings with respect to mud flaps as employed on semi-trailers and particularly such trailers as are required to carry the west coast wheel setting. Employment of the teachings disclosed herein will enable much improved spray and particle deflection on the highways while affording the additional quality of longer life and greater reliability with respect to trailer mud flaps. Present instances of high replacement rate and the prevalent situation of operating with defective mud guards will be avoided or greatly reduced.

Changes may be made in the combination and arrangement of elements as heretofore set forth in the specification and shown in the drawing; it being understood that the changes may be made in the embodiments disclosed without departing from the spirit and scope of the invention as defined in the following claims.

What is claimed is:

1. An improved mud flap device for affixure to a truck trailer or the like having the rear wheels affixed for support such that the rear edge of the rear wheels is located approximately at the rear edge of the trailer, the mud flap device to be suspended behind the vehicle wheels and forward of a vertically suspended truck bumper assembly at the rear end of said trailer, the device comprising:

flap securing means secured to said trailer underside immediately adjacent the forward side of said truck bumper assembly;

flap means formed from bendable material and being reenforced to take a permanent shape which includes an upper portion in a first vertical plane and a rearwardly extending portion disposed generally transversely and terminating in a lower portion lying in a second vertical plane which is rearwardly disposed by several inches from said first vertical plane, the upper edge of said upper portion being adapted to be secured within said securing means, and said transverse rearwardly extending portion of said flap means being formed to extend around and rearward beneath said truck bumper.

2. An improved mud flap device as set forth in claim 1 which is further characterized to include:

one or more metal reenforcing straps secured to said upper portion of the flap means and maintained vertically aligned therewith.

3. An improved mud flap device as set forth in claim 1 wherein said stiffening means comprises:

one or more metal reenforcing straps each aligned in the vertical dimension of said flap means and imbedded within said flap means bendable material.

4. An improved mud flap device as set forth in claim 2 which is further characterized in that angle-shaped metal means is secured across each of said metal reenforcing straps transversely at said rearwardly extending portion.

5. An improved mud flap device as set forth in claim 1 which is further characterized to include:

frame means extending vertically within said upper portion of the flap means and being affixed to transverse frame means extending across said transverse rearward extending portion, said frame means and transverse frame means providing stiffening reenforcement.

6. An improved mud flap device for affixure to a truck trailer or the like having the rear wheels affixed for support such that the rear edge of the rear wheels is located approximately at the rear edge of the trailer, the mud flap device to be suspended behind the vehicle wheels and forward of a vertically suspended truck bumper assembly at the rear end of said trailer, the device comprising:

flap securing means secured to said trailer underside immediately adjacent the forward side of said truck bumper assembly;

flap means formed from bendable material and being reenforced to take a permanent shape which includes an upper portion in a first vertical plane and a rearwardly extending portion disposed generally transversely and terminating in a lower portion lying in a second vertical plane which is rearwardly disposed by several inches from said first vertical plane, the upper edge of said upper portion being adapted to be secured within said securing means, and said transverse rearwardly extending portion of said flap means being formed to extend around and rearward beneath said truck bumper;

flap means formed from bendable material and being reenforced to take a permanent shape which includes a planar portion secured in said flap securing means to extend down between said trailer rear wheel and said bumper assembly, and including a forwardly extending transverse portion formed on the forward side of the planar portion immediately forward of the lowest extremity of said bumper assembly.

7. An improved mud flap device as set forth in claim 6 which is further characterized to include:

forwardly extending side portions formed on each side of said mud flap means along the vertical length thereof, and formed from said bendable material in integral formation to said flap means.

* * * * *